(12) United States Patent
Maegawa

(10) Patent No.: US 6,888,783 B2
(45) Date of Patent: May 3, 2005

(54) WOBBLE DETECTION CIRCUIT CORRESPONDING TO A PLURALITY OF MEDIA HAVING DIFFERENT PRE-FORMATS AND OPTICAL DISK APPARATUS HAVING REDUCED SIZE

(75) Inventor: Hiroshi Maegawa, Kanagawa (JP)

(73) Assignee: Ricoh Company, Ltd. (JP)

( * ) Notice: Subject to any disclaimer, the term of this patent is extended or adjusted under 35 U.S.C. 154(b) by 102 days.

(21) Appl. No.: 10/101,201

(22) Filed: Mar. 20, 2002

(65) Prior Publication Data

US 2002/0136126 A1 Sep. 26, 2002

(30) Foreign Application Priority Data

Mar. 21, 2001 (JP) ........................................ 2001-081152

(51) Int. Cl.[7] ............................................. G11B 7/095
(52) U.S. Cl. ................ 369/53.2; 369/44.13; 369/44.26; 369/44.28; 369/124.05; 369/124.07; 369/124.11; 369/275.3
(58) Field of Search ............................ 369/53.2, 44.28, 369/44.26, 44.13, 109.01, 124.05, 124.07, 124.11, 275.3, 43, 47.25, 44.25, 44.35, 124.13, 47.21, 59.1, 44.27, 44.34, 53.23, 105, 275.4

(56) References Cited

U.S. PATENT DOCUMENTS

| | | | | |
|---|---|---|---|---|
| 4,879,707 A | * | 11/1989 | Getreuer et al. | ......... 369/44.28 |
| 5,166,921 A | * | 11/1992 | Matsui | ..................... 369/275.3 |
| 5,717,679 A | | 2/1998 | Mashimo et al. | |
| 5,764,610 A | | 6/1998 | Yoshida et al. | |
| 6,005,832 A | | 12/1999 | Kumagai | |
| 6,084,843 A | | 7/2000 | Abe et al. | |
| 6,088,307 A | | 7/2000 | Fushimi et al. | |
| 6,172,956 B1 | | 1/2001 | Fuji | |
| 6,233,394 B1 | | 5/2001 | Jeong et al. | |
| 6,483,787 B1 | * | 11/2002 | Sugasawa et al. | ....... 369/44.13 |
| 6,487,149 B1 | | 11/2002 | Yokoi et al. | |
| 6,556,523 B1 | | 4/2003 | Masui | |
| 6,580,684 B2 | * | 6/2003 | Miyake et al. | ........... 369/275.3 |
| 2002/0024897 A1 | | 2/2002 | Nakajima | |
| 2003/0021217 A1 | | 1/2003 | Kim et al. | |
| 2003/0072231 A1 | | 4/2003 | Matsui | |
| 2003/0099172 A1 | | 5/2003 | Park et al. | |
| 2003/0099180 A1 | | 5/2003 | Park et al. | |

FOREIGN PATENT DOCUMENTS

| | | |
|---|---|---|
| EP | 0 753 845 A1 | 1/1997 |
| EP | 0 874 356 A2 | 10/1998 |
| EP | 0 938 084 A2 | 8/1999 |
| EP | 0 939 397 A2 | 9/1999 |
| EP | 1184847 | 3/2002 |
| EP | 1 318 508 A2 | 11/2003 |
| JP | 07169078 | 7/1995 |
| JP | 08185664 | 7/1996 |
| JP | 08194969 A | 7/1996 |

(Continued)

OTHER PUBLICATIONS

Database WPI, Section EI, Week 199904, XP002264073, Mar. 30, 1998.
Kendall Castor–Perry, "Programmable Filters", Encyclopedia of Electrical and Electronics Engineering Online, Online Posting Date: Dec. 27, 1999.

*Primary Examiner*—Tan Dinh
*Assistant Examiner*—Kim-Kwok Chu
(74) *Attorney, Agent, or Firm*—Dickstein Shapiro Morin & Oshinsky LLP

(57) ABSTRACT

A wobble detection circuit detects a signal by a common photodetector (light receiving) element from several kinds of media having different pre-formats. Further, the wobble detection circuit changes a gain for amplifying the signal in a wobble signal detection process depending on the pre-format of a reproducing or recording medium to obtain a wobble signal.

5 Claims, 11 Drawing Sheets

FOREIGN PATENT DOCUMENTS

| | | |
|---|---|---|
| JP | 08339556 A | 12/1996 |
| JP | 10064166 | 3/1998 |
| JP | 11066578 | 3/1999 |
| JP | 11066602 A | 3/1999 |
| JP | 11161982 A | 6/1999 |
| JP | 11238245 A | 8/1999 |
| JP | 2000-207745 | 7/2000 |
| JP | 2000231726 | 8/2000 |
| JP | 2000231726 A | 8/2000 |
| JP | 2001-093147 | 4/2001 |
| JP | 2001-134943 | 5/2001 |
| JP | 2001266486 A | 9/2001 |
| JP | 2002-074674 | 3/2002 |
| JP | 2003-30878 | 1/2003 |
| JP | 2003-059056 | 2/2003 |
| WO | WO 03/034413 | 4/2003 |

* cited by examiner

FIG.3A
FIG.3B
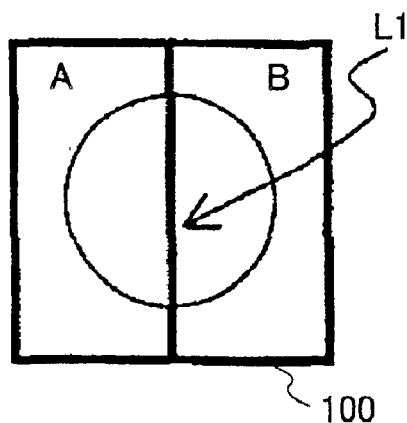
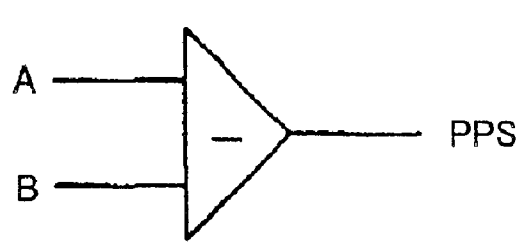
FIG.4A
FIG.4B
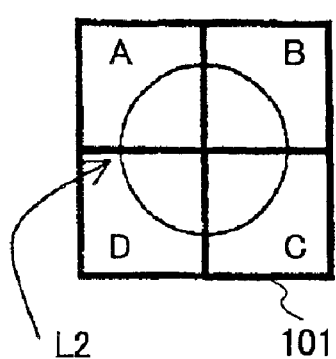
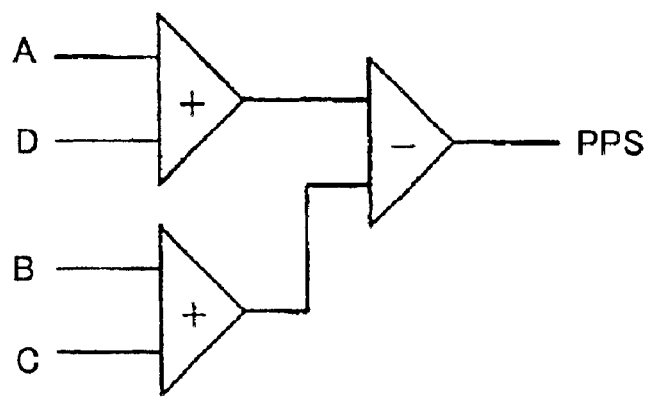

WOBBLE DETECTION CIRCUIT CORRESPONDING TO A PLURALITY OF MEDIA HAVING DIFFERENT PRE-FORMATS AND OPTICAL DISK APPARATUS HAVING REDUCED SIZE

BACKGROUND OF THE INVENTION

1. Field of the Invention

The present invention relates to a circuit for detecting a wobble signal from various kinds of media having different pre-formats.

2. Description of the Related Art

A general recording medium employs a pre-format in which a wobble signal frequency detectable from deviation of tracks formed on the medium becomes constant when constant linear velocity (CLV) rotation control is performed in order to detect a linear velocity at a radial position accurately. A detailed description of the wobble signal will be given later.

The wobble signal frequency differs depending on the pre-format. For example, CD, DVD-RAM, and DVD-R have different wobble signal frequencies. Additionally, physical address information is also necessary so as to identify an approximate position in an unrecorded area. However, the physical address information is obtained by different method depending on the pre-format. For example, the physical address information is obtained by performing frequency modulation to the wobble signals in a CD, by prepits in a DVD-RAM, and by land prepits formed between tracks in a DVD-R.

A simple method to cope with a plurality of media having different pre-formats is to carry detection circuits exclusive for respective pre-formats in parallel and to select the detection circuit depending on the pre-format of the medium to be accessed.

In Japanese Laid-Open Patent Application No. 2000-207745 "Wobble Clock Generating Circuit and Optical Disc Apparatus Using the Same", two or more filter circuits are provided so as to select the filter suitable for the wobble signal that changes frequency according to rotational errors of a spindle motor.

As in the case of the above-mentioned publication, there is a case where a plurality of the filter circuits are carried in parallel even for one formatted medium and the suitable filter circuit is selected and used. A structure in the above-mentioned case is for preventing performance of the wobble signal detection from deteriorating due to change of rotational velocity of the medium.

Thus, in an apparatus which records on and reproduces a plurality of the media having various pre-formats, when the wobble detection circuits exclusive for respective pre-formats are provided or when, as in the above publication, a plurality of filter circuits are carried in parallel for one pre-format medium, the circuit size becomes very large. Accordingly, power consumption increases and it becomes difficult to reduce the circuit size.

SUMMARY OF THE INVENTION

It is a general object of the present invention to provide an improved and useful circuit structure in which the above-mentioned problems are eliminated.

The object described above is achieved, according to one aspect of the present invention, by a wobble detection circuit, wherein: a signal is detected by a common photodetector (light receiving) element from several kinds of media having different pre-formats; and a gain for amplifying the signal in a wobble signal detection process is changed depending on the pre-format of a reproducing or recording media to obtain a wobble signal. Thus, a wobble signal of good quality can be detected since signal-processing can be performed while maintaining suitable signal strength with regard to signals obtained by a plurality of media having different pre-formats and signal strength as well as different frequencies of signals.

The object described above is also achieved, according to another aspect of the present invention, by a wobble detection circuit, wherein a plurality of divided photodetector (light receiving) elements are provided, each of the photodetector elements receives reflectional light from each corresponding medium among several kinds of media having different pre-formats, and a pair of outputs of the photodetector element are selected so as to share a rear processing circuit. Thus, many parts of the wobble detection circuit can be used in common irrespective of the pre-formats of the media, and power consumption can be reduced since the size of the wobble detection circuit is reduced. Additionally, the above-mentioned wobble detection circuit can be applied to an optical system having a divided structure for each photodetector element.

The object described above is also achieved, according to another aspect of the present invention, by a wobble detection circuit, wherein a plurality of divided photodetector (light receiving) elements are provided, each of the photodetector elements receives reflectional light from each corresponding medium among several kinds of media having different pre-formats, and after obtaining push-pull signals from outputs of the photodetector elements, one of the push-pull signals is selected so as to use the rear processing circuit in common. Thus, a part of the wobble detection circuit can be used in common irrespective of the pre-formats of the media, and the power consumption can be reduced since the size of the circuit is reduced. Additionally, it is possible to obtain the wobble signals of good quality since the process up to the generation of a push-pull signal is performed before a selector, and homologous noise components superimposed on two signals input to a subtracting amplifier can be eliminated effectively.

The object described above is also achieved, according to another aspect of the present invention, by the wobble detection circuit, wherein wobble signals of good quality can be obtained since a gain for amplifying the signal in a wobble signal detection process is changed depending on the pre-format so that signal processing is possible while maintaining suitable signal strength for the signals obtained by the plurality of media having different pre-formats as well as frequencies of the wobble signals.

The object described above is also achieved, according to another aspect of the present invention, by the wobble detection circuit, wherein a plurality of filter circuits having variable frequency characteristics are provided, and the filter circuit is selected according to the wobble frequency to be detected. Thus, it is possible to obtain the wobble signals of good quality by providing an exclusive circuit for each wobble frequency with regard to an important part relating to performance of signal detection, while using a part of the circuit in common irrespective of the pre-formats of the media.

The object described above is also achieved, according to another aspect of the present invention, by the wobble detection circuit, wherein the frequency characteristic of the filter circuit is changed according to the frequency to be detected. Thus, it is possible to detect a wobble signal with the single filter circuit from a multitude of media having different pre-formats. Additionally, the single filter circuit can be used in a CAV (constant angular velocity) access in which the wobble frequency is changed continuously.

The object described above is also achieved, according to another aspect of the present invention, by the wobble detection circuit that can be used for pre-formats of various frequencies merely by setting a dividing ratio calculated by relationship between a channel clock signal and a wobble signal to a divider circuit, since a signal obtained by dividing the channel clock of reproducing or recording data by a variable divider circuit is used for a reference signal determining the frequency characteristic of the filter circuit.

The object described above is also achieved, according to another aspect of the present invention, by the wobble detection circuit, wherein the polarity of the wobble signal is inverted depending on the pre-format of the media. Thus, it is possible to generate a binary wobble signal with a desired polarity irrespective of the given polarity of the wobble signal of each pre-format.

The object described above is also achieved, according to another aspect of the present invention, by the wobble detection circuit, wherein characteristics of the wobble detection circuit are changed and a selection of a physical address detection circuit is made based on a selected signal depending on the pre-format. Thus, an operation of an unused address detection circuit can be stopped. At the same time, an output terminal of the address signal as well as a terminal of the wobble signal can be used in common when the wobble detection circuit is carried on such as an LSI, so that the size of a package can be reduced.

The object described above is also achieved, according to another aspect of the present invention, by an optical disk apparatus that carries the wobble detection circuit and can record on or reproduce several kinds of the media having different pre-formats. Thus, it is possible to realize a small and power-saving optical disk apparatus having effective and high-performance circuit structure.

Other objects, features and advantages of the present invention will become more apparent from the following detailed description when read in conjunction with the following drawings.

BRIEF DESCRIPTION OF THE DRAWINGS

FIG. 3A is an illustrative drawing showing a divided-by-two photodetector (light receiving) element;

FIG. 3B is an illustrative drawing showing a subtracting amplifier producing a push-pull signal;

FIG. 4A is an illustrative drawing showing a divided-by-four photodetector (light receiving) element;

FIG. 4B is an illustrative drawing showing adding amplifiers and a subtracting amplifier producing a push-pull signal;

DETAILED DESCRIPTION OF THE PREFERRED EMBODIMENTS

Figure 1:
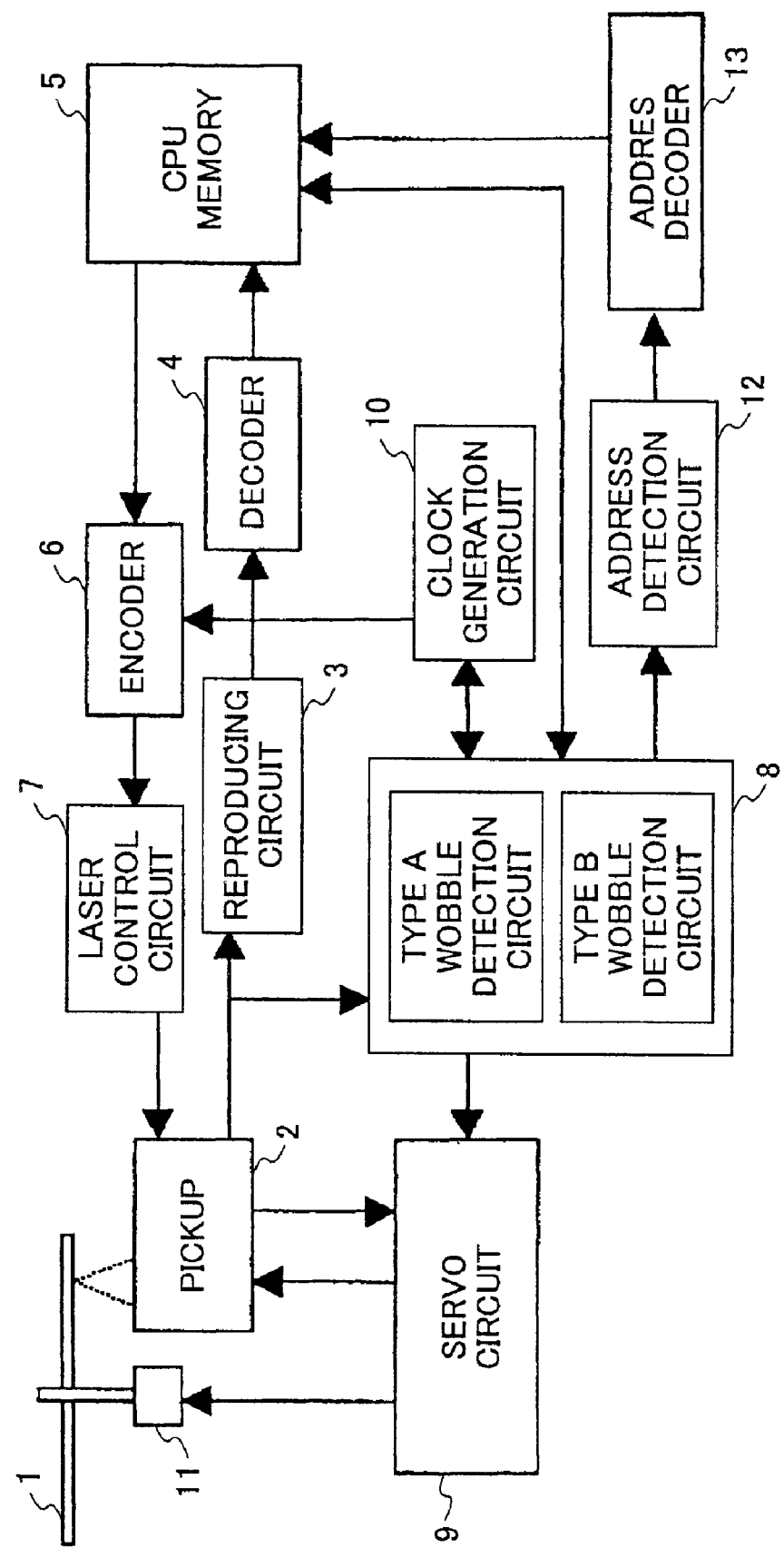
FIG. 1 is a block diagram showing a general structure of an optical disk apparatus.

FIG. 1 is a schematic diagram showing an optical disk apparatus. A spot of laser light is emitted on a medium 1, and reflection light is detected by a pickup 2. The reproducing signal detected is processed at a reproducing circuit 3. The data format of a user data component generated by the reproducing circuit 3 is converted by a decoder 4. The converted user data is delivered to an external host (illustration thereof is omitted) via a CPU 5.

Additionally, information to be recorded is delivered from the external host to an encoder 6 via the CPU 5. The data format of the information is converted by the encoder 6. Then, the information is written on the medium 1 such that a laser controlling circuit 7 controls emission of the laser carried on the pickup 2 according to information bit.

On the other hand, a push-pull signal (a kind of track error signal) detected by the pickup 2 is sent to a wobble detection circuit 8. A wobble signal extracted is sent to a servo circuit 9 or a clock generation circuit 10. The servo circuit 9 controls rotation of a motor 11 carrying the medium 1. The clock generation circuit 10 generates an accurate clock following rotation of the medium 1.

Additionally, the push-pull signal including the physical address is sent to an address detection circuit 12. Then, the push-pull signal is converted into address information by an address decoder 13. The address decoder 13 decodes the address information of accessing position. The pickup 2 carries an objective lens that focuses the laser light and a photodetector (light receiving) element that receives the reflection light from the medium 1.

Figure 2:
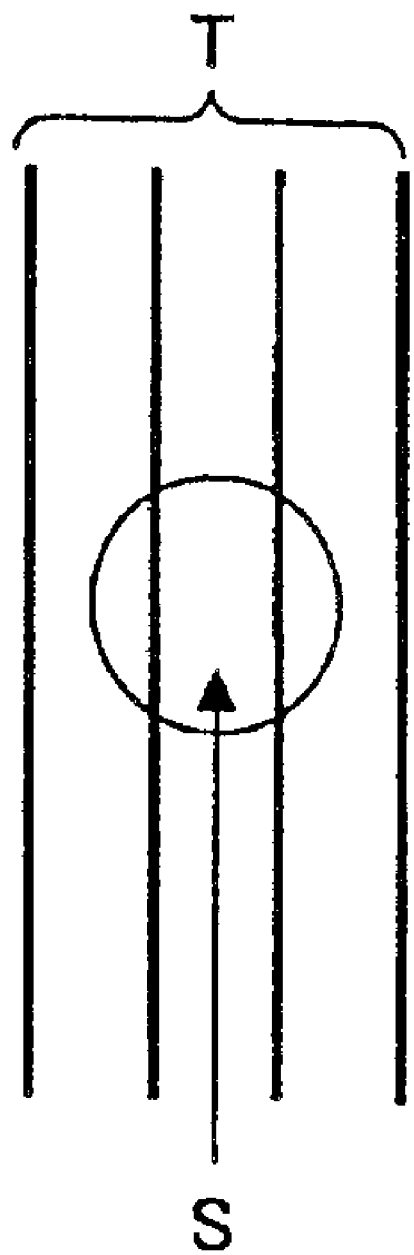
FIG. 2 is an enlarged view of a part of a medium.

The simplest example of a generation method of the wobble signal used in the present invention is to detect the wobble signal from the push-pull signal. FIG. 2 shows an enlarged view of a part of the medium, and tracks T and a spot S are shown. The push-pull signal is obtained by a difference between the reflection light in the right side and the reflection light in the left side with respect to a dividing line in a direction tangential to the track. FIG. 3A shows a divided-by-two photodectector (light receiving) element 100, which is divided into two photodetector parts A and B by a dividing line L1. The dividing line L1 is in a tangential direction to the track. Output signals of the photodetector parts A and B will respectively be denoted by A and B. FIG. 3B shows a subtracting amplifier reproducing the push-pull signal PPS. When the divided-by-two photodetector element is used, the push-pull signal PPS can be obtained by subtracting B from A using the subtracting amplifier shown in FIG. 3B.

FIG. 4A shows a divided-by-four photodetector (light receiving) element 101 divided into four photodetector parts A, B, C and D by the dividing line L1 and a dividing line L2. The dividing line L2 is orthogonal to the track. The output signals of the photodetector parts A, B, C and D will respectively be denoted by A, B, C and D. FIG. 4B shows two adding amplifiers and a subtracting amplifier. When the divided-by-four photodetector element is used, the push-pull signal PPS can be obtained as follows: the adding amplifiers add A and B to D and C, respectively. Then, the subtracting amplifier calculates a difference between the two calculated results, that is, (A+D)−(B+C). Accordingly, the wobble signals can be obtained from predetermined components included in the push-pull signals obtained as described above.

A description will be given of the wobble detection circuit of the present invention.

Figure 5:
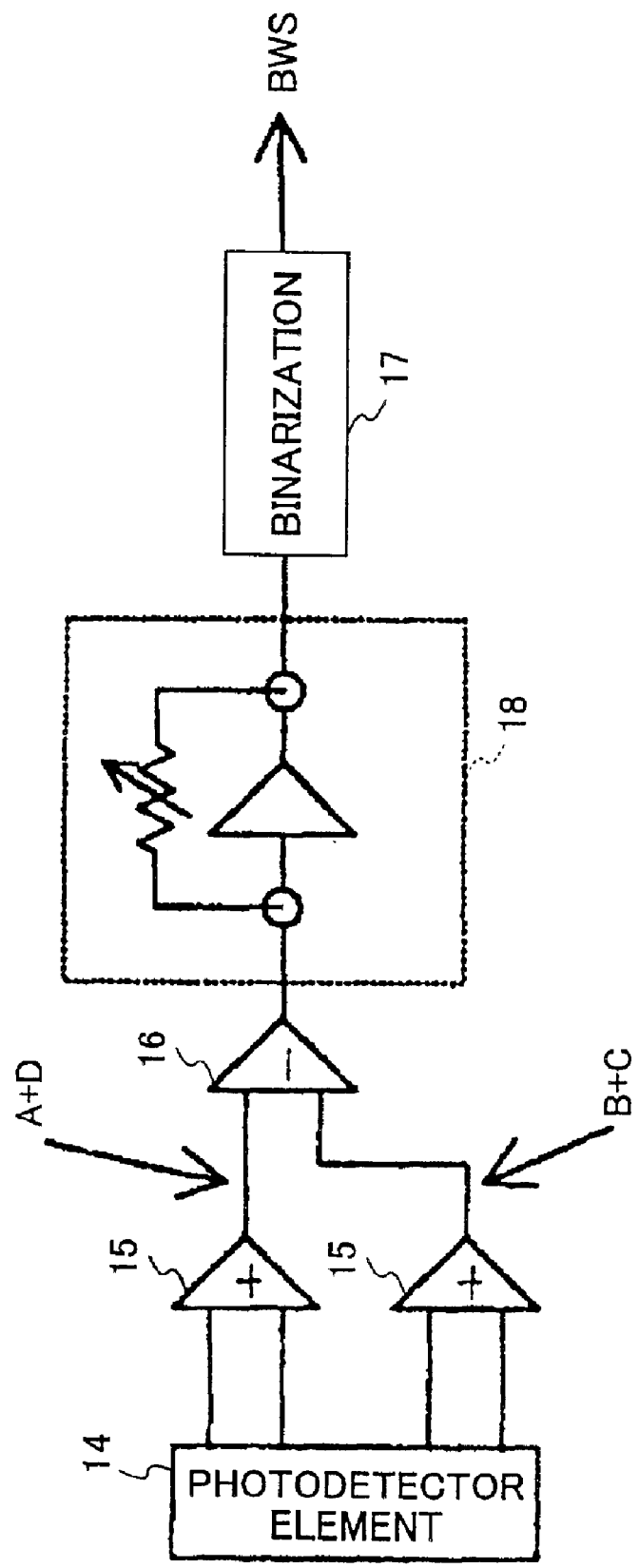
FIG. 5 is a block diagram showing a first embodiment of the present invention.

FIG. 5 is a schematic diagram showing a first embodiment (corresponding to claim 1) of the present invention. In this embodiment, a photodetector (light receiving) element is used in common for receiving the reflection light from the medium irrespective of the pre-format.

It is assumed that a photodetector (light receiving) element 14 is the divided-by-four photodetector (light receiving) element. A and D, and B and C are symmetric with respect to the dividing line that is orthogonal to the track. Two adding amplifiers 15 add A and B to D and C, respectively, so as to generate two signals A+D and B+C. The two signals are divided by the dividing line in the tangential direction to the track. Needless to say, the photodetector (light receiving) element 14 may be the divided-by-two photodetector (light receiving) element or a structure of more parts as long as the two signals divided by the dividing line in the tangential direction to the track are generated.

The push-pull signals are generated by calculating the difference between the two signals by a subtracting amplifier 16. Then, by digitalizing the push-pull signals by a binary circuit 17, binary wobble signals BWS are produced. Any one of the amplifiers in the process described above or an amplifier 18 inserted between the subtracting amplifier 16 and the binary circuit 17 may have a gain switching function so as to set an appropriate gain in accordance with the pre-format.

The amplifier 18 is surrounded by a broken line so as to indicate that the adding amplifier 15 or the subtracting amplifier 16 may include the function of the amplifier 18. For, since the wobble signal strength standardized at the reproducing signal level differs depending on the pre-format, the appropriate gain for obtaining the binary wobble signals BWS of high quality differs depending on the pre-format.

Figure 6:
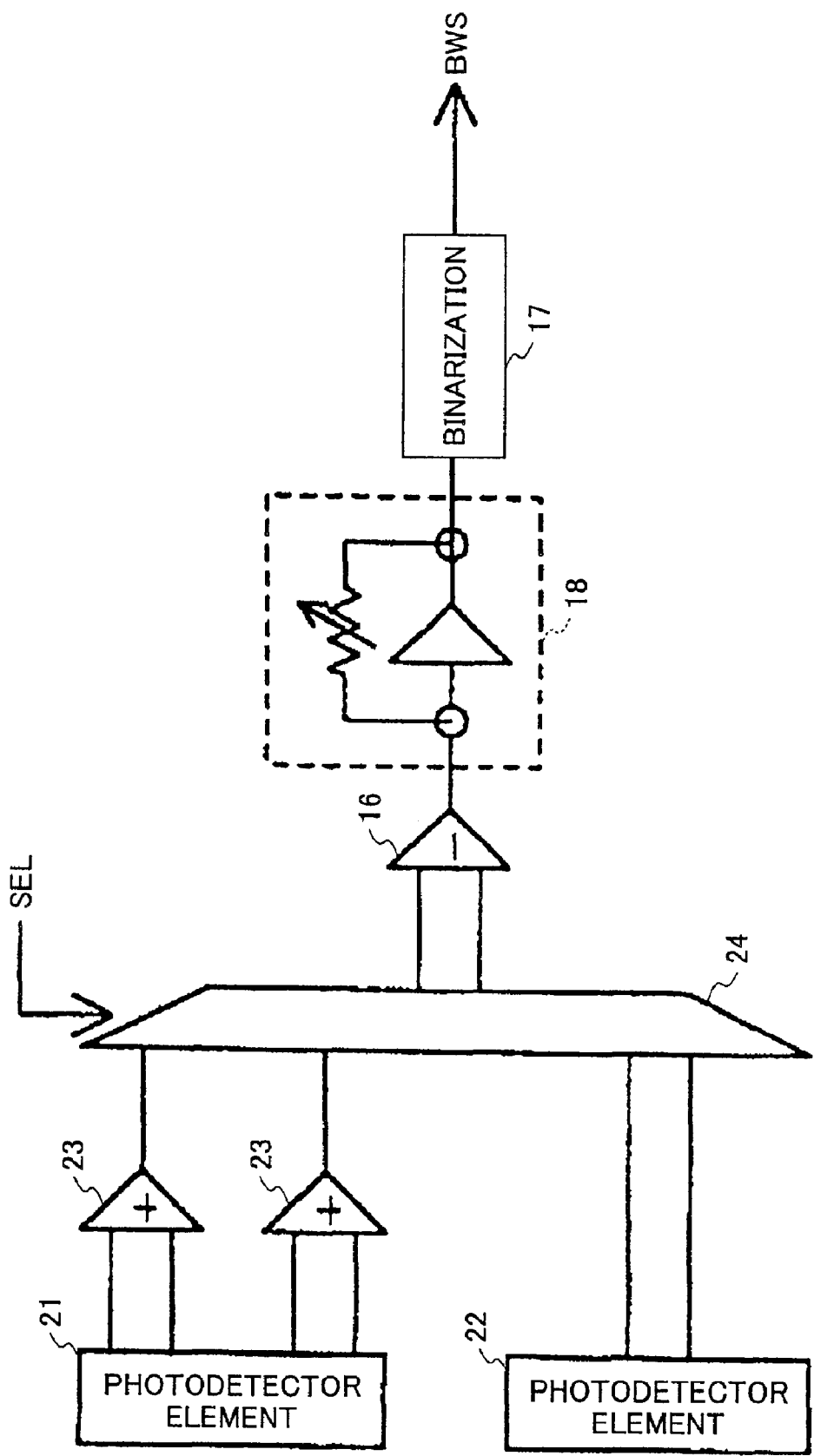
FIG. 6 is a block diagram showing a second embodiment of the present invention.

FIG. 6 is a schematic diagram showing a second embodiment (corresponding to claims 2 and 4) of the present invention. This embodiment shows the structure of the wobble signal detection circuit when the divided photodetector element receiving the reflection light from the medium differs depending on the pre-format. Further, in FIGS. 6 through 12, those elements that are the same as those corresponding elements in FIG. 5 are designated by the same reference numerals.

Figure 7:
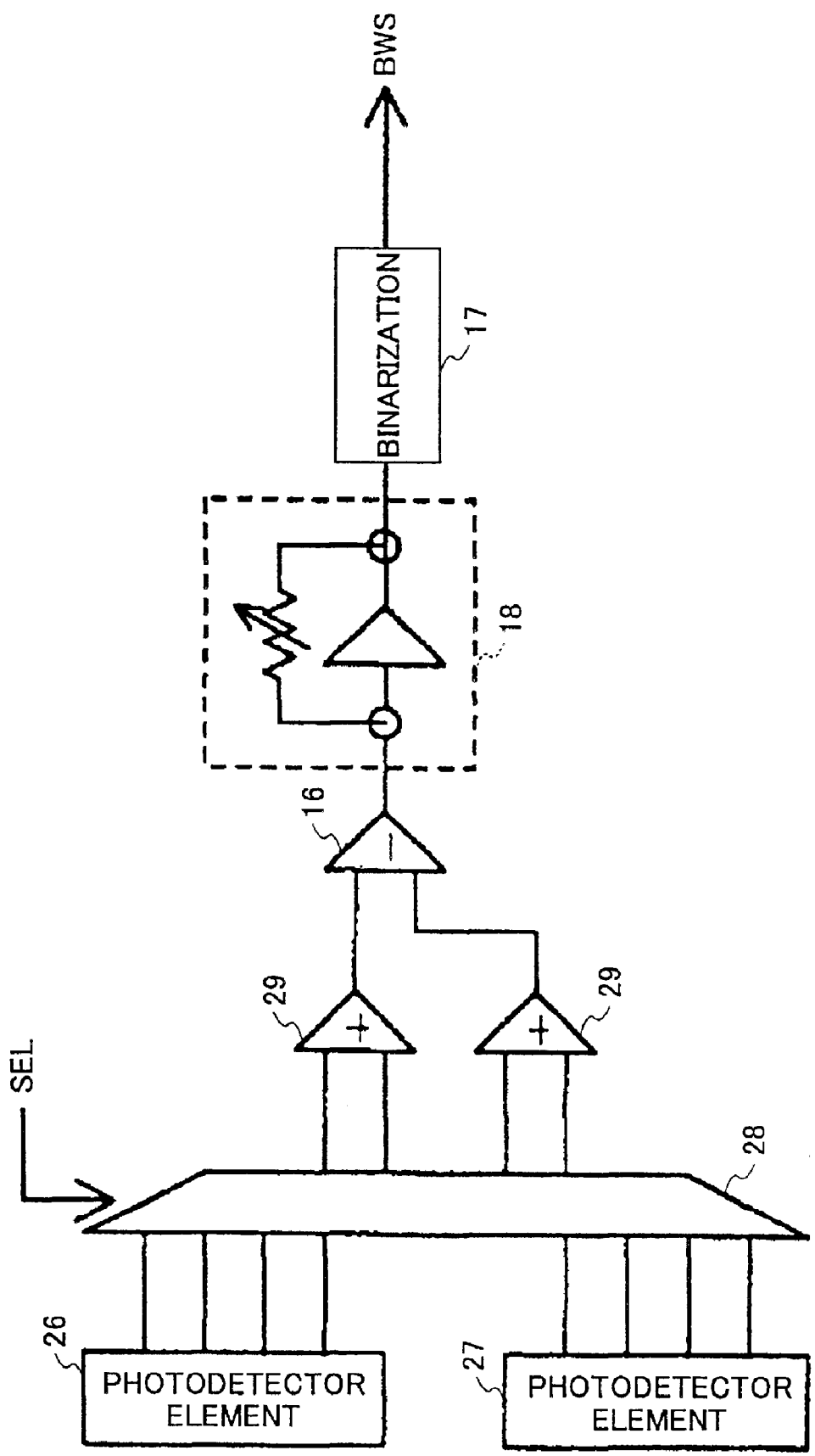
FIG. 7 is a block diagram showing a second embodiment of the present invention.
Figure 8:
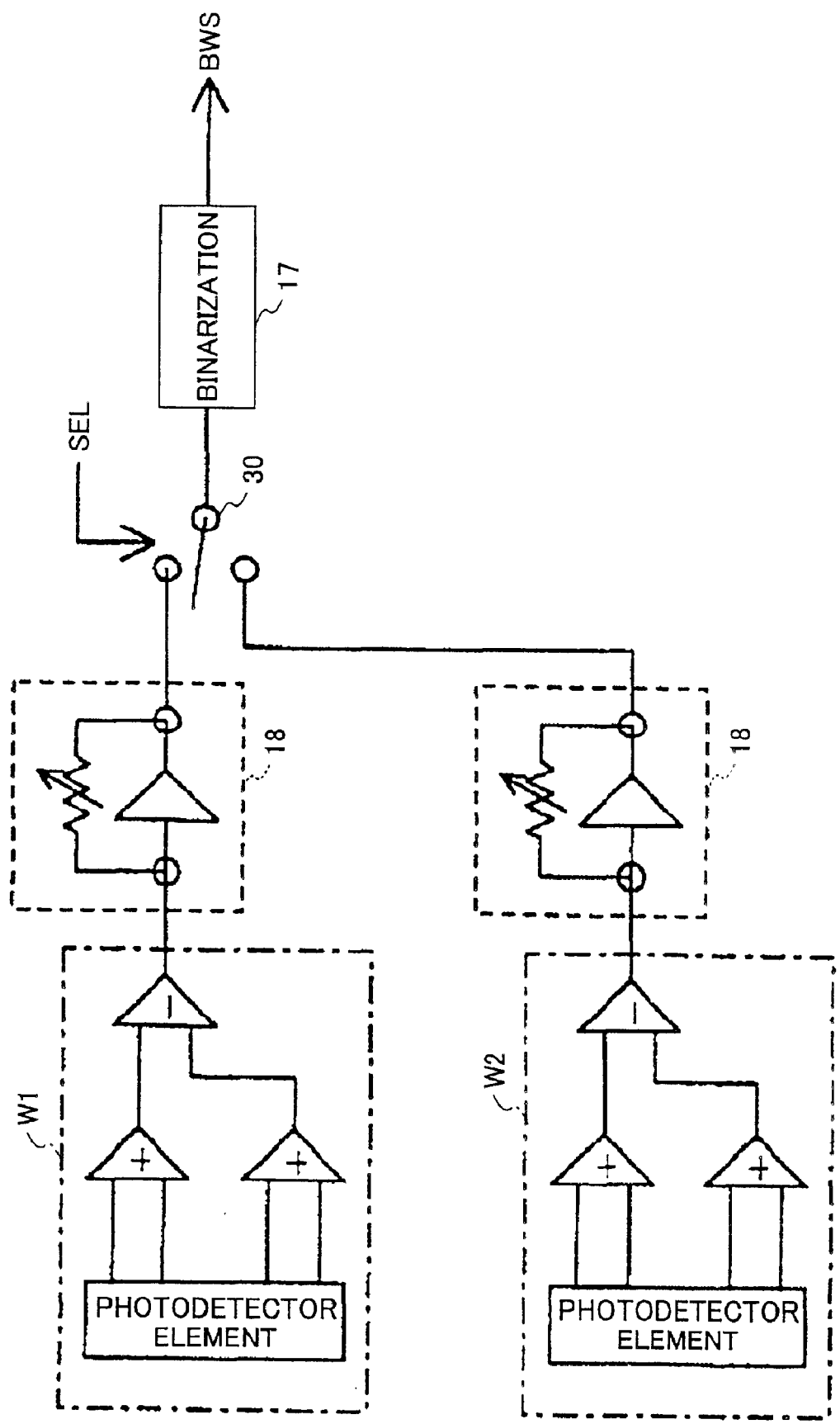
FIG. 8 is a block diagram showing a third embodiment of the present invention.

In FIGS. 6 through 8, two types of the pre-formats, a type A and a type B, are shown as examples. Additionally, in FIG. 6, it is assumed that a photodetector (light receiving) element 21 of the type A is a divided-by-four photodetector element, and a photodetector (light receiving) element 22 of the type B is a divided-by-two photodetector element. Thus, in order to make the circuit after the subtracting amplifier 16 the same as the circuit shown in FIG. 5, it is preferable to select signals before the subtracting amplifier 16.

That is, a signal processing of the type A pre-format is as follows: with regard to outputs of the photodetector element 21, each addition amplifier 23 adds a pair of the signals that are symmetric with respect to the dividing line; the dividing line is orthogonal to the track; two signals generated are divided by the dividing line in the tangential direction to the track. The outputs of the photodetector element 22 of the type B are directly input to a selector 24 since the photodetector element 22 is the divided-by-two photodetector element. Needless to say, the photodetector elements may alternately be structures with more blocks instead of the divided-by-two photodetector element or the divided-by-four photodetector element, as long as two signals divided by the dividing line in the tangential direction to the track are produced before the signals are sent to the selector 24. The pairs of signals obtained from a plurality of media having different pre-formats are input to the selector 24, and a pair of signals are selected by the pre-format selection signal SEL. The process thereafter is the same as the process of the circuit in FIG. 5.

FIG. 7 shows a case where a plurality of photodetector (light receiving) elements 26 and 27 have parts of the same number. In this case, outputs of these photodetector elements 26 and 27 may directly be input to a selector 28. Then, the signals selected by the selector 28 may be added up by an adding amplifier 29.

FIG. 8 shows a third embodiment (corresponding to claims 3 and 4) of the present invention.

As shown by a type A wobble detection circuit W1 and a type B wobble detection circuit W2, a plurality of circuits are provided in parallel as many as the number of the photodetector elements. The circuits have the same structure as the circuit shown in FIG. 5 with regard to a part from the divided photodetector element 14 to the subtracting amplifier 16. A selector 30 selects an output from the outputs of the wobble detection circuits W1 and W2. The binary wobble signal is obtained by the binary circuit 17. Needless to say, it may be possible to provide a plurality of circuits including the structure from the detection circuit to the binary circuit 17 in parallel. However, it is preferable that the output is selected before the output is input to an output terminal so as not to increase the number of the output terminals when the circuit is incorporated in an LSI.

The same as the amplifier shown in FIG. 5, the amplifiers 18 in FIGS. 6 through 8 surrounded by the broken lines have the gain switching function so as to set the gain suitable for the pre-formats (corresponding to claim 4). Needless to say, the adding amplifier or the subtracting amplifier may have the function mentioned above. Especially, the gain switching function is necessary for the amplifiers 18 in FIGS. 6 and 7 since the amplifiers 18 are provided between a plurality of detection circuits and a single binary circuit 17. On the other hand, when the amplifier 18 is provided for each detection circuit, the amplifier 18 may have a fixed amplification function suitable for a pre-format.

Figure 9:
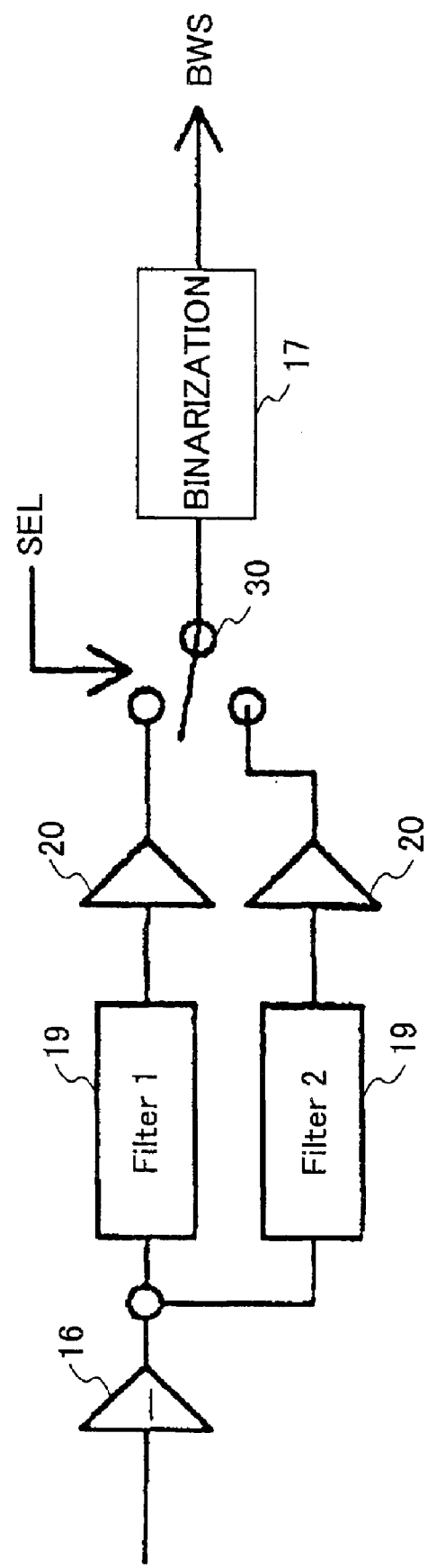
FIG. 9 is a block diagram showing a fourth embodiment of the present invention.

FIG. 9 shows a fourth embodiment (corresponding to claim 5) of the present invention.

The part before the subtracting amplifier 16 is the same as the corresponding part of the circuit mentioned above. The output of the subtracting amplifier 16, a push-pull signal, passes through a filter circuit 19 for extracting the wobble signal component by eliminating a noise component. Then, the push-pull signal is amplified to proper amplitude by an amplifier 20, and converted into a digital signal by the binary circuit 17. Sets of the filter circuit 19 and the amplifier 20 exclusive for corresponding pre-formats are provided in parallel as many as the number of the pre-formats, or sets of the filter circuit 19 and the amplifier 20 that serve for a plurality of pre-formats of the wobble signal frequencies that are approximately the same may also be provided. When the set of the filter circuit 19 and the amplifier 20 serves for a plurality of pre-formats, the number of the photodetector elements and the number of the filters may be different.

Outputs of the amplifiers 20 are sent to the selector 30. One of the outputs is selected by the selecting signal SEL corresponding to the pre-format. The selected output is input to the binary circuit 17. The above explanation is given on the assumption that the subtracting amplifier 16 receives outputs from a plurality of adding amplifiers. Needless to say, it may be possible to employ a structure in which the filter circuit is provided after the selector 30. In this structure, the selector 30 selects one of the outputs of the plurality of subtracting amplifiers. Then, the selected output is sent to the filter circuit.

Figure 10:
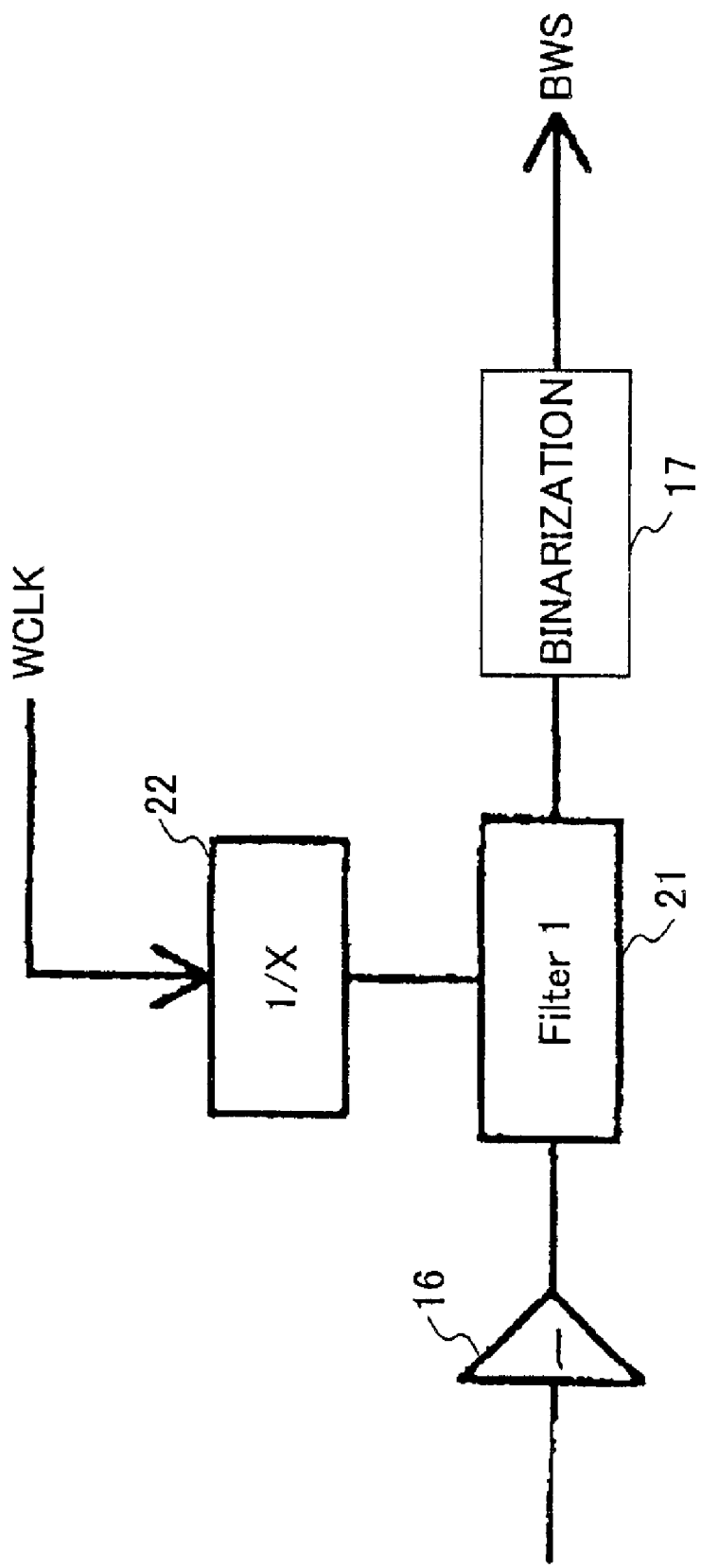
FIG. 10 is a block diagram showing a fifth embodiment of the present invention.

FIG. 10 shows a fifth embodiment (corresponding to claims 6 and 7) of the present invention.

A filter circuit 21 extracts a wobble signal component from the push-pull signal output by the subtracting amplifier 16 by eliminating the noise component. The filter circuit 21 is a variable frequency characteristic filter that can be used in common for the pre-formats of different wobble signal frequencies. The variable frequency characteristic is such that a cut-off frequency of the filter changes according to a signal provided from outside of the circuit, a data channel clock signal, for example, or a frequency of a reference signal obtained by dividing a data channel clock signal by a 1/X frequency divider circuit 22.

As a general circuit, there are a SCF (switched capacitor filter) and a phase comparison filter. These filters can change the frequency characteristics almost continuously. Thus, providing the filter circuit 21 is equivalent to providing a plurality of filters that have different fixed frequency characteristics. Accordingly, providing the filter circuit 21 has the advantages of size and characteristics. For example, the wobble signal frequency changes continuously depending on radius when rotating a medium at CAV (constant angular velocity) when the wobble is formed on the medium so as to realize the CLV (constant linear velocity). The wobble signal frequency becomes low at the inner diameter and high at the outer diameter. Accordingly, it is necessary to provide a multitude of filters, each of which has different fixed frequency characteristics, when accessing the medium of CLV format at CAV. However, it is preferable to use the filter of variable frequency characteristics since better continuity is secured.

Figure 11:
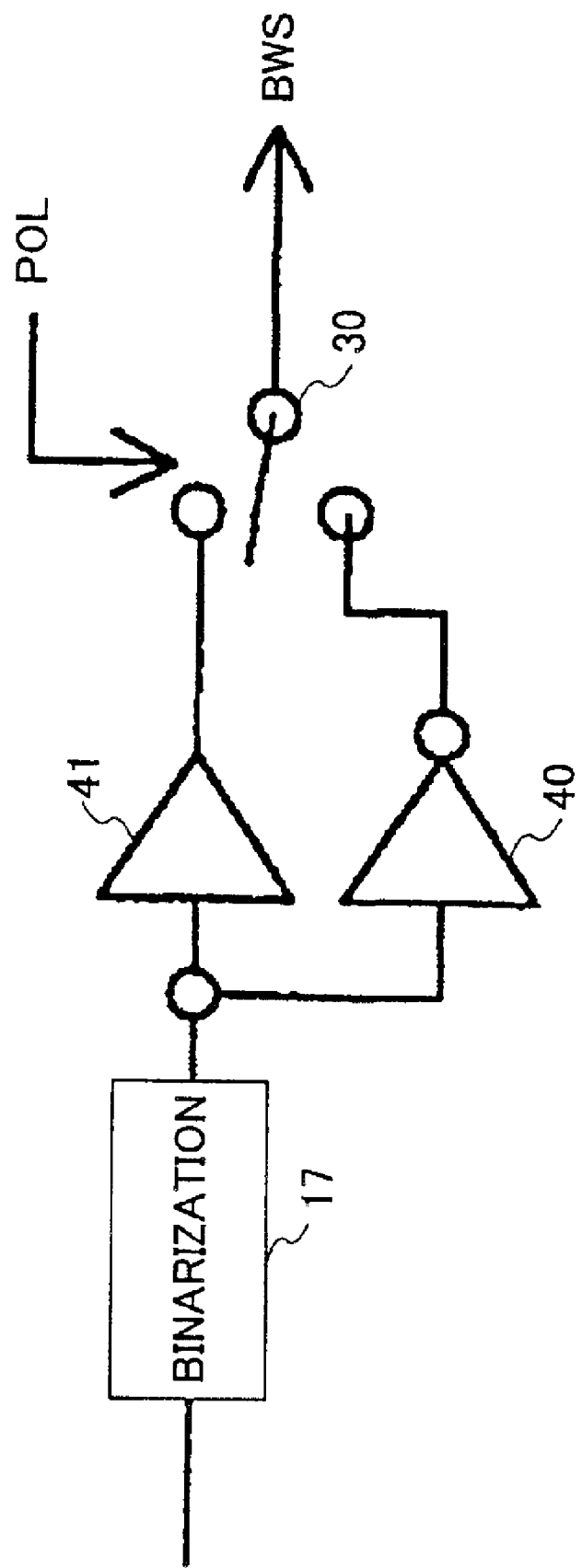
FIG. 11 is a block diagram showing a sixth embodiment of the present invention.

FIG. 11 shows a sixth embodiment (corresponding to claim 8) of the present invention.

In an example shown in FIG. 11, the circuit ahead of the binary circuit 17 is the same structure as the circuit mentioned above. The binary wobble signal BWS digitized by the binary circuit 17 passes through both an inversion buffer 40 that reverses the polarity and an noninversion buffer 41 that does not change the polarity. Then, the selector 30 selects one of outputs of the inversion buffer 40 and the noninversion buffer 41. The selector 30 makes a selection based on a polarity selection signal POL as a connection-switching signal. A structure may also be possible in which the polarity of the signal output by the subtraction amplifier is reversed though the illustration thereof is omitted.

Figure 12:
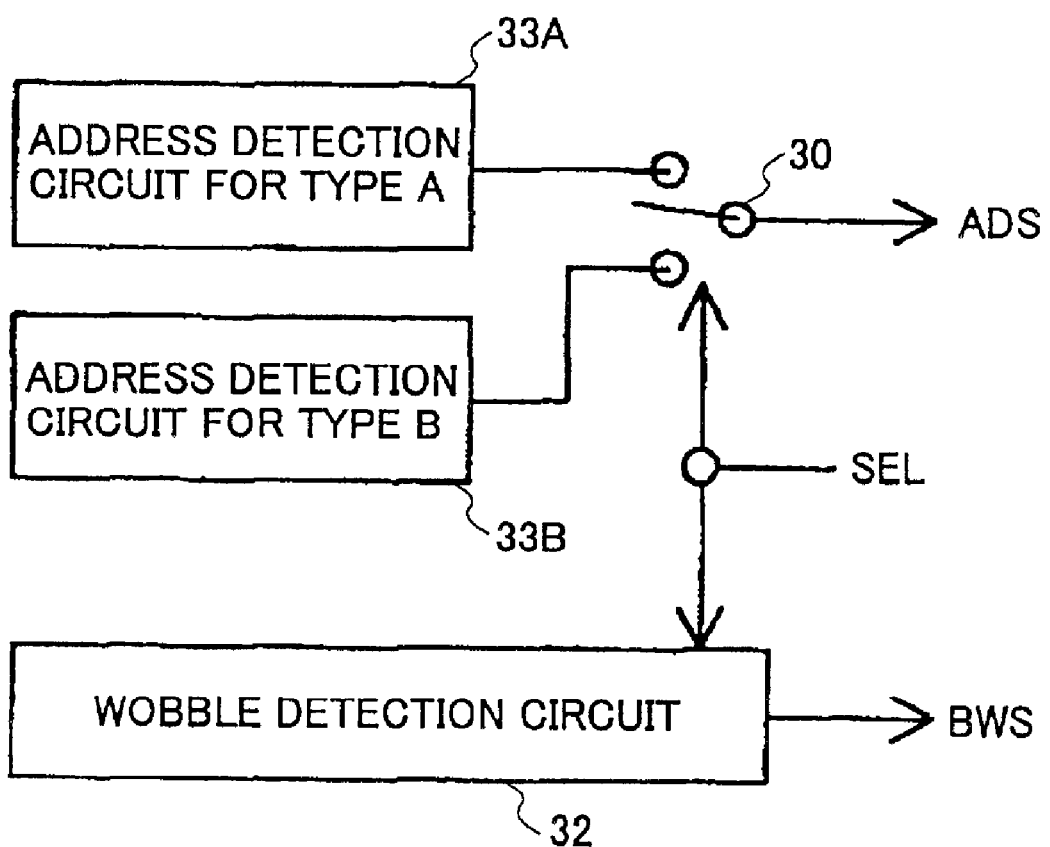
FIG. 12 is a block diagram showing a seventh embodiment of the present invention.

FIG. 12 shows a seventh embodiment (corresponding to claim 9) of the present invention.

A physical address is formed on a medium for recording so that an approximate position can be identified though in an unrecorded area. For example, the physical address can be identified by frequency modulation to the wobble signals in CD, by prepits between tracks in DVD-RAM, and by LPP (land prepits) between tracks in DVD-R. When the pre-format differs in this way, a physical address detection circuit as well as the wobble signal frequency differ. Thus, by using selection signal SEL that selects the wobble detection circuit 32 depending on the pre-format, the selector 30 switches address detection circuits (for example, an address detection circuit 33A for the type A pre-format and an address detection circuit 33B for the type B pre-format as shown in FIG. 12) so as to obtain an address signal ADS.

As mentioned above, when a plurality of media with different pre-formats use the same detection circuits of the wobble signal and the address signal in common, not only the size of the circuit can be reduced but also an output terminal can be used in common so as to use a small size package.

The present invention is not limited to the specifically disclosed embodiments, and variations and modifications may be made without departing from the scope of the present invention.

The present application is based on Japanese priority application No. 2001-081152 filed on Mar. 21, 2001, the entire contents of which are hereby incorporated by reference.

What is claimed is:

1. A wobble detection circuit, comprising:
    an optical system having a plurality of photodetector (light receiving) elements corresponding to several kinds of media having different pre-formats, the optical system receiving reflectional light from a medium at the photodetector elements, each of the photodetector elements being divided at least into two parts by a line tangential to a track formed on the medium;
    a selector selecting a set of outputs to be used from sets of outputs of the plurality of photodetector elements;
    a subtracting amplifier obtaining a difference signal between the set of outputs selected by the selector;
    a second amplifier changing a gain of an output of the subtracting amplifier depending on the pre-format of a reproducing or recording medium; and
    a binary circuit converting an output of the second amplifier into a digital signal;
    wherein the selection of the set of outputs from sets of outputs of the plurality of photodetector elements depends on the pre-format of a reproducing or recording medium.

2. A wobble detection circuit, comprising:
    an optical system having a plurality of photodetector (light receiving) elements corresponding to several kinds of media having different pre-formats, the optical system receiving reflectional light from a medium at the photodetector elements, each of the photodetector elements being divided at least into two parts by a line tangential to a track formed on the medium;
    a plurality of subtracting amplifiers, each subtracting amplifier obtaining a difference between a set of outputs of the corresponding one of the photodetector elements;
    a plurality of second amplifiers, each changing a gain of an output of a corresponding one of the subtracting amplifiers depending on a pre-format of a reproducing or recording medium;
    a selector selecting an output from outputs of the plurality of the second amplifiers; and a binary circuit converting an output of the selector into a digital signal, wherein the selection of the output from the outputs of the plurality of the second amplifiers depends on the pre-format of a reproducing or recording medium.

3. A wobble detection circuit, wherein:

a signal is detected by a common photodetector (light receiving) element from several kinds of media having different pre-formats; and a gain for amplifying the signal in a wobble signal detection process is changed depending on the pre-format of a reproducing or recording medium to obtain a wobble signal, wherein a filter circuit having variable frequency characteristic is provided, and the frequency characteristic of the filter circuit is changed depending on wobble frequency to be detected, the filter circuit having:

the frequency characteristic determined according to a frequency of a provided reference signal; and a divider circuit dividing a channel clock signal to obtain a reference signal for reproducing or recording data, wherein an output of the divider circuit is regarded as the reference signal of the filter circuit, and the frequency characteristic of the filter circuit is changed by changing a dividing ratio.

4. A wobble detection circuit, wherein:

a signal is detected by a common photodetector (light receiving) element from several kinds of media having different pre-formats; and a gain for amplifying the signal in a wobble signal detection process is changed depending on the pre-format of a reproducing or recording medium to obtain a wobble signal, wherein an inversion circuit inverting polarity of the wobble signal and a selector selecting noninversion or inversion are provided, and the polarity is selected depending on the pre-format of the reproducing or recording medium.

5. The wobble detection circuit as claimed in claim 4, comprising a plurality of physical address detection circuits corresponding to the pre-formats and a selector selecting a physical address detection circuit, wherein characteristics of the wobble detection circuit are changed and selection of the physical address detection circuit is made based on a selecting signal that depends on the pre-format of the reproducing or recording medium.

* * * * *